United States Patent
Weigand (12)

(10) Patent No.: US 6,411,614 B1
(45) Date of Patent: Jun. 25, 2002

(54) DYNAMIC RECOVERY OF A TDMA SIGNAL DURING AN UNDETECTED MARKER SEQUENCE

(75) Inventor: David L. Weigand, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/183,567

(22) Filed: Oct. 30, 1998

(51) Int. Cl.[7] ............................................... H04B 7/212
(52) U.S. Cl. ....................... 370/347; 370/350; 370/337; 370/314
(58) Field of Search ................................ 370/280, 294, 370/310, 314, 321, 328, 337, 347, 348, 349, 350, 442, 465, 468

(56) References Cited

U.S. PATENT DOCUMENTS 5,257,311 A * 10/1993 Naito et al. .................. 380/48
5,722,085 A * 2/1998 Horikawa .................... 455/557
5,748,621 A * 5/1998 Masuda et al. ............. 370/337
5,991,308 A * 11/1999 Fuhrmann ................... 370/474
6,028,933 A * 2/2000 Heer et al. ...................... 380/9
6,040,725 A * 3/2000 Lee et al. .................... 327/175
6,097,704 A * 8/2000 Jackson et al. ............. 370/280

* cited by examiner

*Primary Examiner*—Hassan Kizou
*Assistant Examiner*—Tim Spafford
(74) *Attorney, Agent, or Firm*—Skjerven Morrill LLP; Philip W. Woo (57) ABSTRACT

A system includes a modem which receives a burst of a time division multiple access (TDMA) signal. A burst mode controller, connected to the modem, is operable to detect a unique word in the burst. If the unique word is not detected, the burst mode controller loads a predetermined bit pattern into a channel identifier field of the burst. The predetermined bit pattern indicates that a payload field of the burst contains voice data.

21 Claims, 8 Drawing Sheets

DYNAMIC RECOVERY OF A TDMA SIGNAL DURING AN UNDETECTED MARKER SEQUENCE

CROSS-REFERENCE TO RELATED PATENTS

This application relates to the subject matter disclosed in the following United States Patents:

U.S. Pat. No. 5,598,419 to Weigand et al., entitled "Dynamic Synchronization Code Detection Window;"

U.S. Pat. No. 5,666,366 to Malek et al., entitled "Inter-Base Synchronization Technique For A TDMA Communication System;"

U.S. Pat. No. 5,668,813 to Malek et al., entitled "Dynamic Synchronization Code Detection Window;"

U.S. Pat. No. 5,729,543 to Weigand et al., entitled "Sequencer Employing Conditional Logic In A TDMA Burst Mode Controller;"

U.S. Pat. No. 5,802,076 to Weigand et al., entitled "Audio Error Mitigation Technique For A TDMA Communication System;"

U.S. Pat. No. 5,822,308 to Weigand et al., entitled "Multi-Tasking Sequencer For A TDMA Burst Mode Controller;" and U.S. Pat. No. 5,822,313 to Malek et al., entitled "Seamless Handover In A Cordless TDMA System."

The above patents are assigned to the present Assignee and are incorporated herein by reference.

FIELD OF THE INVENTION

This invention relates to time division multiple access (TDMA) communications systems, and in particular, to the dynamic recovery of a TDMA signal during an undetected marker sequence.

BACKGROUND

In a TDMA communications system, a number of transmitters can transmit on the same frequency channel, but at different times. A remote receiver for receiving a particular transmitted signal knows before hand at what approximate time the transmitted signal will occur and is enabled only during that time. Details for such a TDMA communications system are provided in U.S. Pat. No. 5,598,419, which is incorporated by reference herein.

Figure 1:
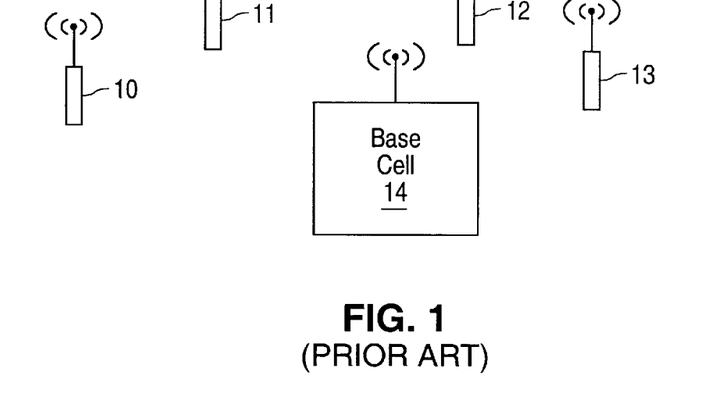
FIG. 1 illustrates a base station and portable stations in a conventional TDMA system.

The TDMA technique makes very efficient use of the frequency spectrum since multiple users may use the same radio-frequency (RF) channel at the same time without interfering with one another. FIG. 1 illustrates one type of TDMA system where a plurality of remote portable stations 10, 11, 12, and 13 share a same frequency channel while transmitting to and receiving from a base station 14. The portable stations 10–13 can be, for example, wireless telephones, and the base station 14 can be a high-power transponder base cell. All communications between portable stations 10–13 are routed through base station 14. For communication, each of portable stations 10–13 and base station 14 contains a transceiver which operates in various modes, such as set-up/control mode, transmit/receive mode, data mode, etc.

One embodiment for such a TDMA system is the Personal Handy Phone System (PHS), the requirements for which are described in RCR Standard-28, incorporated herein by reference. As an alternate embodiment, such a TDMA system may be the ETSI DECT standard, also incorporated herein by reference. Further, slow frequency hopping systems, compliant with C.F.R. Title 47, part 15, and intended for the U.S. ISM-bands, may be derived from the aforementioned formal standards.

Figure 2:
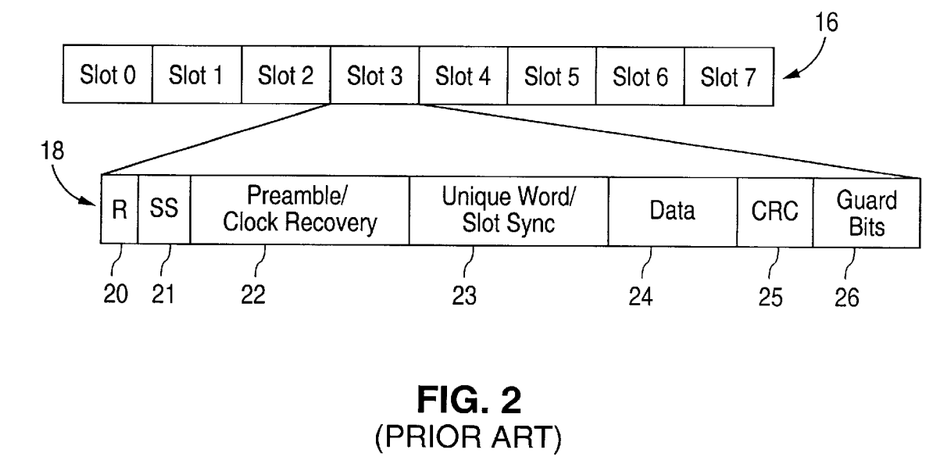
FIG. 2 illustrates a transmitted frame and slots on a single frequency channel in a conventional TDMA system.

In a TDMA system, each remote transceiver (e.g., portable stations 10–13), when active, is allocated certain times slots within which it may transmit a bursted signal or receive a bursted signal. FIG. 2 illustrates a frame 16 containing slots 0 through 7, where frame 16 is repeated on a signal frequency channel. The period of frame 16 may be, for example, 5 msecs. Assuming all four portable stations 10–13 in FIG. 1 are being actively used at the same time, portable stations 10, 11, 12, and 13 may be allocated slots 0, 1, 2, and 3, respectively, for transmitting bursted signals to base station 14, while portable stations 10, 11, 12, and 13 may be allocated slots 4, 5, 6, and 7, respectively, for receiving bursted signals from base station 14. The amount of information stored in each of portable stations 10–13 during a frame period is transmitted in a burst within a single slot. In one embodiment, the bit rate of the transmitted bits in a slot is approximately 384K bits per second, and the corresponding symbol rate is, therefore, 192K symbols per second.

A sample protocol 18 which dictates the information required to be transmitted during a single slot is also shown in FIG. 2. Protocol 18 may consist of a ramp-up (R) field 20, a start symbol (SS) field 21, a preamble and/or clock recovery field 22, a unique word or slot synchronization field 23, a data field 24 (typically used as a traffic channel or TCH), a CRC (for error correction and verification) field 25, and a guard bits field 26. The lengths and types of fields in a protocol vary depending on the mode of the transceiver (e.g., set-up/control mode, transmit/receive mode, etc.). While in the traffic mode, where voice is to be transmitted, data field 24 contains audio or voice data.

Modern, digital TDMA communication systems require very accurate synchronization in the time domain. To achieve this, such systems commonly employ a known marker sequence within the TDMA burst architecture. In the case of the conventional TDMA system (such as the PHS) described above, the "unique word" of protocol 18 is used as the marker sequence for each burst. The unique word is chosen to have special orthogonal properties which yield a sharp peak during an auto-correlation process performed at a transceiver. When the marker sequence is detected by the transceiver, the transceiver's time-base is re-aligned to the incoming signal. Thus, the transceiver completely re-synchronizes on each frame. Afterwards, the payload data in the burst can be properly recovered. If environmental conditions (such as noise or fading) exist which adversely affect the RF channel, however, proper detection of the marker sequence may not be possible even though the payload data in the burst may be unaffected.

In previously developed TDMA systems, the payload data in the burst cannot be decoded if the marker sequence is not detected. These previously developed systems treat data for voice and non-voice (e.g., control) communication in the same way when the marker sequence is undetected for a burst—i.e., the payload data for that burst is not processed. For non-voice communication, this is not problematic because the control data can be re-transmitted. For voice communication, however, the payload data of a burst is lost forever. This can cause a significant degradation in sound quality for voice communication, which in turn, may lead to the dissatisfaction, and ultimately, the loss of customers for a provider operating such a previously developed TDMA system.

What is needed is a system and method by which the payload data of a TDMA signal can be recovered even when the marker sequence is undetected.

SUMMARY

A TDMA transceiver architecture is described which dynamically recovers the payload data of a TDMA signal even when the signal's marker sequence is not detected. This transceiver architecture is based on a high-inertia TDMA system. That is, once synchronization is achieved between a portable station and a base station, the portable station does not completely re-synchronize on each frame, but instead operates on its own internal crystal (clock) and adjusts its time-base as appropriate during each frame to stay in synchronization with the base station. Accordingly, the portable station remains well-aligned on a frame-by-frame basis. Thus, if the unique word is undetected (for example, due to undesirable RF channel conditions), the portable station can nonetheless determine the location of the payload data in the signal due to that station's independent, free-running time-base.

In one embodiment, if the unique word for a slot is undetected, a TDMA transceiver of the present invention assumes that voice data is carried in the payload of such slot. The TDMA transceiver then defines the channel identifier (CI) field for the slot as one which identifies the payload as voice data. The TDMA transceiver processes the payload accordingly, whether or not the payload is actually voice data. If indeed the payload carries voice data, such data is recovered and not lost, and therefore, sound quality is not degraded when the marker sequence is not detected.

Furthermore, the TDMA transceiver includes a mechanism for detecting errors. Specifically, such TDMA transceiver uses the CRC (for error detection and verification) field as a check on the data carried within the payload field. Thus, if it is assumed that the payload carries voice data, but the CRC field indicates otherwise, the processed payload is not output as audio information, but rather, will be discarded.

According to one embodiment of the present invention, a system includes a modem which receives a burst of a time division multiple access (TDMA) signal. A burst mode controller, connected to the modem, is operable to detect a unique word in the burst. If the unique word is not detected, the burst mode controller loads a predetermined bit pattern into a channel identifier field of the burst. The predetermined bit pattern indicates that a payload field of the burst contains voice data.

According to another embodiment of the present invention, a method includes the following steps: receiving a burst of a time division multiple access (TDMA) signal; attempting to detect a unique word in the burst; and loading a predetermined bit pattern into a channel identifier field of the burst if the unique word is not detected, the predetermined bit pattern indicating that a payload field of the burst contains voice data.

Thus, an important technical advantage of the present invention includes the ability to recover the payload data of a TDMA signal even when that signal's marker sequence is undetected. Another important technical advantage of the present invention includes an error-detection mechanism. Accordingly, the present invention improves the quality of voice communication in a TDMA system, thereby promoting customer satisfaction and loyalty for a provider. Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE PREFERRED EMBODIMENTS

The preferred embodiments of the present invention and their advantages are best understood by referring to FIGS. 3–10 of the drawings. In the various drawings, like numerals are used for like and corresponding parts.

TDMA Transceiver Architecture

Figure 3:
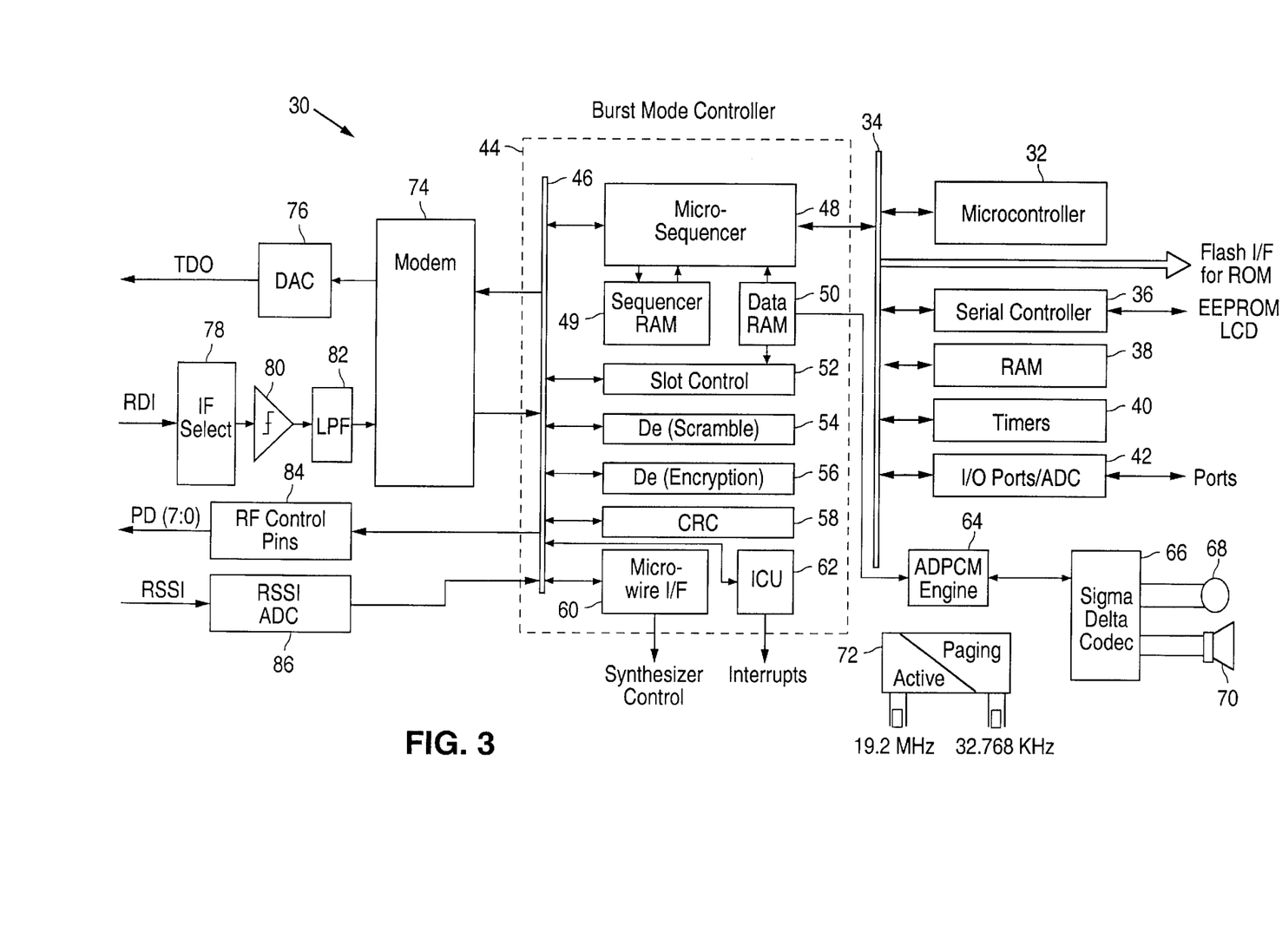
FIG. 3 illustrates the basic architecture for a preferred embodiment TDMA system transceiver.

FIG. 3 illustrates a preferred embodiment for a TDMA transceiver 30 which allows the dynamic recovery of a TDMA signal when that signal's marker sequence is undetected. This transceiver 30 may be used in a TDMA system such as shown in FIG. 1, for example, by incorporation into any one or more of portable stations 10–13.

As shown, transceiver 30 includes a microcontroller 32. Microcontroller 32 can be a compact, reduced instruction set computing (RISC) microcontroller, such as a Model CR-16 from National Semiconductor Corporation. A system bus 34 connects microcontroller 32 to a serial controller 36, a random access memory (RAM) 38, one or more timers 40, and one or more input/output (I/O) ports and analog-to-digital converters (ADCs) 42. Serial controller 36 can be coupled to an electrically erasable programmable read-only memory (EEPROM) liquid crystal display (LCD) for control thereof. RAM 38 is used for storing various information, such as program variables, mailbox information, and stack parameters. System bus 34 also functions to connect transceiver 30 to a flash interface (I/F) for ROM.

A burst mode controller (BMC) 44 is connected to system bus 34. In general, BMC 44 creates the various slots for transmission of data and controls the timing of the information within each of the slots. Furthermore, BMC 44 operates upon data received and transmitted by TDMA transceiver 30. BMC 44 includes a BMC bus 46 connected to system bus 34 via a micro-sequencer 48.

Micro-sequencer 48 builds the slots for transmission at synchronized times. In addition, micro-sequencer 48 controls the overall bit synchronization for each slot. For example, in one embodiment, micro-sequencer 48 issues multi-bit control flow signals in order to build the slots within a frame and ensure the bits within the slots are synchronized with a base station transceiver. Furthermore, micro-sequencer 48 may initiate, execute, run, and/or otherwise control a receive (RX) slot control routine which operates on a bursted signal received at transceiver 30. The slot control routine manages the reception and processing of the received bursted signal, on a slot-by-slot basis, to recover data, such as speech (or voice) data, user packet data, or control data carried as a payload therein. Micro-sequencer 48 can also generate or output signals for controlling an RF deck. Micro-sequencer 48 is described below in more detail.

A sequencer RAM 49 and a data RAM 50 are connected to micro-sequencer 48. Sequencer RAM 49 stores microcode/instructions for micro-sequencer 49. Data RAM 50 stores certain protocol bits and data bits which will be called upon during operation of TDMA transceiver 30 to build a slot for transmission and for reception. Some of these protocol and data bits can be inserted into a slot. Data RAM 50 functions to store voice data for a previous frame; such previous voice data can be replayed as part of an error mitigation protocol which is run when voice data for a current frame cannot be recovered. Access to data RAM 50 can be controlled by micro-sequencer 48.

Slot control 52, scramble/descramble engine 54, encryption/de-encryption engine 56, and CRC engine 58 are connected to BMC bus 46. Slot control 52 and the above engines 54–58 generally perform baseband processing. These elements may operate upon payload data received at, or to be transmitted out of, TDMA transceiver 30. For example, for a received signal, slot control 52, scramble/descramble engine 54, encryption/de-encryption engine 56, and CRC engine 58 may operate upon a payload field containing a traffic channel (TCH) or VOX logical channel (explained below) to recover the speech data carried therein.

Furthermore, when a marker sequence is not detected for a received bursted signal, CRC engine 58 may load a predetermined bit pattern into a channel identifier (CI) field of the signal to indicate that the payload field contains voice data, whether or not voice data is actually contained therein. If the payload field does indeed contain voice data, the loading of the predetermined bit pattern into the CI field allows the data to be recovered. On the other hand, if the payload does not actually contain voice data, this fact may be revealed by using the CRC field of the received signal as an error detecting mechanism. In one embodiment, CRC engine 58 can be implemented using a linear feedback shift register (LFSR).

A micro-wire interface (I/F) 60 and an interrupt control unit (ICU) 62 are also connected to BMC bus 46. Micro-wire I/F 60 is a serial device. Micro-wire I/F 60 interfaces with at least one RF phase lock loop (PLL). In one embodiment, micro-wire I/F 60 loads a PLL synthesizer in the RF deck. ICU 62 generates interrupt signals, some of which can be used to interrupt microcontroller 32.

An adaptive-differential pulse code modulated (ADPCM) engine 64 is connected to micro-sequencer 48 and operates under control of BMC 44. ADPCM engine 64 provides encoding and decoding of pulse code modulated (PCM) audio data for the data field in a slot. ADPCM engine 64 may also perform or support an error mitigation protocol whereby voice data for a previous frame is repeated if voice data for a current frame cannot be recovered. A sigma delta codec module 66 interacts with ADPCM engine 64 to convert bits of audio information into an audio signal, and vice versa. Sigma delta codec may be implemented using a digital signal processor, an analog-to-digital converter, a digital-to-analog converter, and other suitable circuitry. A microphone 68 and speaker 70 are connected to sigma delta codec module 66 for receiving and outputting, respectively, the audio signal.

An active/paging oscillator module 72 is connected throughout TDMA transceiver 30 and functions as a system clock. Active/paging oscillator module 72 includes a free-running, internal clock, such as, for example, one formed with a piezoelectric crystal. Active/paging oscillator module 72 may run at different frequencies depending the mode of operation for TDMA transceiver 30. For example, in one embodiment, active/paging oscillator module 72 may operate at a super-high frequency (such as 19.2 MHz) for an active mode of transceiver 30 and at a low frequency (such as 32.768 kHz) for a paging mode of transceiver 30. Thus, in paging mode, active/paging oscillator module 72 uses a relatively small amount of power; in active mode, this module uses a large amount of power.

A modem 74 is coupled to BMC 44. Modem 74 generally functions to modulate and demodulate various signals transmitted out of and received by TDMA transceiver 30. For example, modem 74 may receive a bitstream from BMC 44 and operate upon the same to generate a digitally formatted signal for transmission out of transceiver 30. Further, modem 74 may operate upon various signals received at TDMA transceiver 30 to recover a bitstream for input to BMC 44. Modem 74 will be described in detail below.

A digital-to-analog converter (DAC) 76 is coupled to modem 74. DAC 76 receives the digitally-formatted data and information signals generated by modem 74 and converts the same into an analog format. This analog data is then output by DAC 76 in a transmit data out (TDO) signal.

Figure 7:
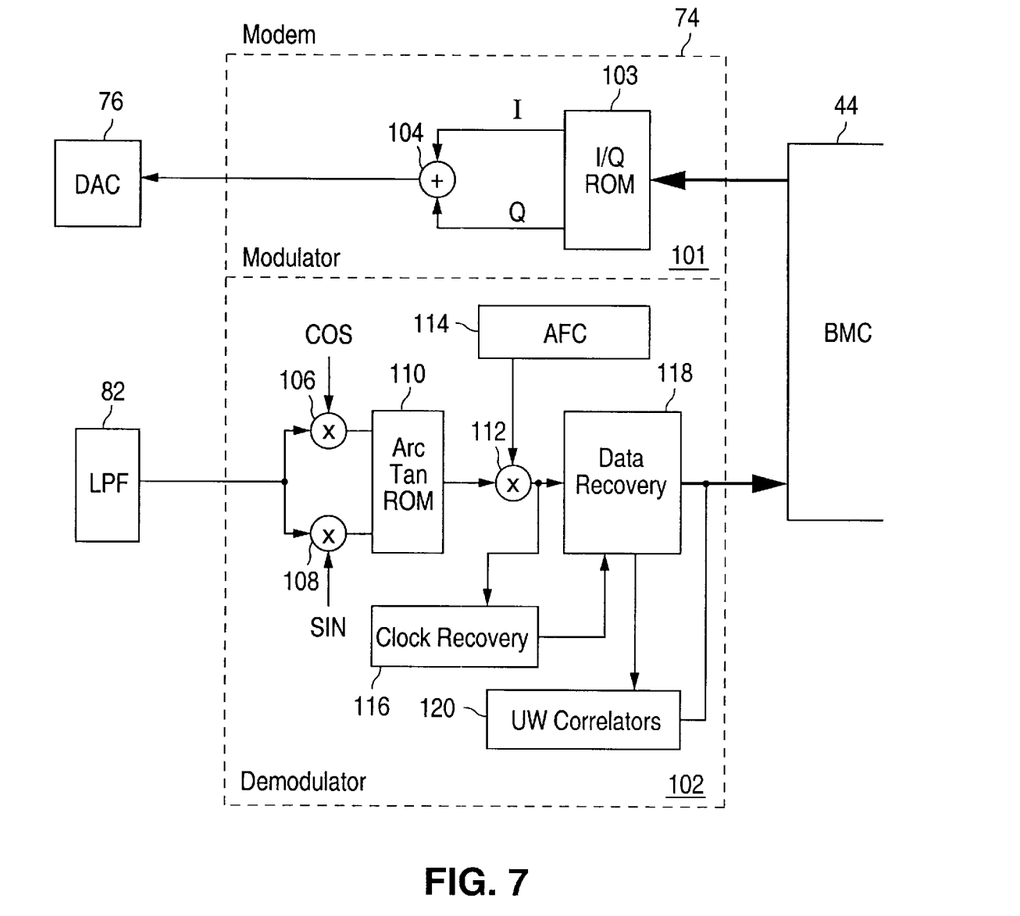
FIG. 7 shows additional details of a modem used in a preferred embodiment.

An intermediate frequency (IF) select module 78, a comparator 80, and a low pass filter (LPF) module 82 are connected in sequence to modem 74 for receiving and initially processing data in a receive data in (RDI) signal. IF select 78 allows the selection of one of a plurality of suitable frequencies for use as an intermediate frequency when processing the RDI signal. In one embodiment, these frequencies include 1.2 MHz and 10.8 MHz. Comparator 80 receives the output of IF select 78. Comparator 80 operates on a baseband bitstream which can then be operated upon by engines 52–56 and correlators (FIG. 7). LPF module 82 performs a low pass filter operation on the signal output by comparator 80.

One or more radio frequency (RF) power-down control pins 84 are connected to BMC 44 for outputting eight power-down (PD) signals to various external devices. For example, RF power-down control pins 84 may be coupled to an RF deck, which can include a power amplifier (PA), phase lock loop (PLL), voltage-controlled oscillator (VCO), and transmit/receive (TX/RX) components. The control signals output to the RF deck can include signals for transmit/receive, power-down, antenna steering, or receive-signal-strength indicator (RSSI) capture.

A receive-signal-strength indicator (RSSI) analog-to-digital converter (ADC) 86 receives an RSSI signal which indicates the strength of the RDI signal. The RSSI signal reflects the effects of various adverse environmental conditions, such as noise or fading, on the RDI signal. RSSI ADC 86 relays the RSSI signal to BMC 44, to which RSSI ADC 86 is coupled.

Protocol

Figures 4, 5:
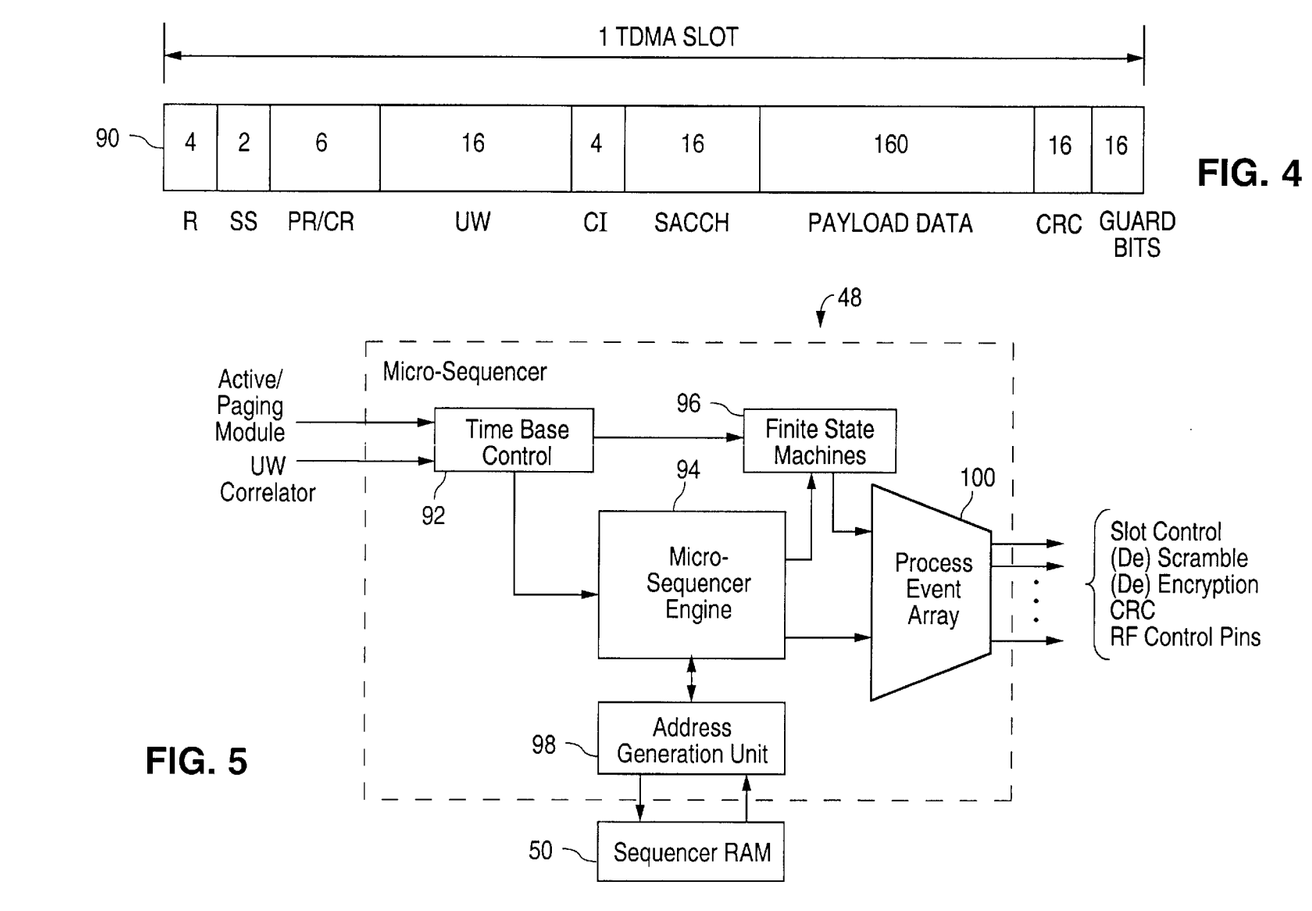
FIG. 4 depicts an exemplary protocol used for a slot in a preferred embodiment TDMA system transceiver.
FIG. 5 shows additional details of a micro-sequencer used in a preferred embodiment.

FIG. 4 depicts an exemplary protocol 90 used in the preferred embodiment TDMA system transceiver. Protocol 90 is a communication protocol for communicating voice traffic.

Protocol 90 can be used for a single slot in a frame of a bursted signal. A frame is for a single frequency channel, and continually repeats while a TDMA system is on; other frequency channels would include identical frames. In the Personal Handy Phone System (PHS), a frame is 5 msec in duration, and each slot has an allocation of approximately 625 microseconds.

As described with respect to FIGS. 1 and 2, a frame may comprise eight slots, such as slots 0–7. Each slot 0–7 represents a burst of information being transmitted from a portable station (e.g., wireless telephone) or by a base station. A first portable station using the frequency band may transmit on slot 0 of each frame and receive on a slot 4 of each frame. The second portable station using the frequency band may transmit on slot 1 of each frame and receive on slot 5. Similar allocations of slots 2, 3, 6 and 7 apply to third and fourth portable stations also actively interfacing with the base station of FIG. 1.

While a portable station is in an active mode, in which voice traffic is being communicated, the protocol (or format) of a slot resembles that of protocol 90. On the other hand, while a portable station is in some mode other than active mode, such as in a standby mode or initiating access to the TDMA system, the protocol (or format) of a slot may differ from that of protocol 90. For example, another protocol can be used for communicating non-voice (e.g., control) traffic.

Referring to FIG. 4, protocol 90 can include either an information channel for non-voice communication or a voice traffic channel. In protocol 90, a ramp-up (R) field is for ramping up a transceiver to the required power level for transmission. The R field may include four bits of information. A start symbol (SS) field, which may include two bits, marks the beginning of data within the slot. A preamble (PR) field, which may comprise a repeated, predefined six-bit code, can be used for clock recovery. A unique word (UW) field may comprise a sixteen-bit, fixed pattern for a marker sequence. This marker sequence can be correlated against a received pattern in order to synchronize a slot to be transmitted or received. The unique word can have one of four different patterns depending upon the current operating mode of transceiver 30. A channel identifier (CI) field defines the structure of a payload field, as described below in more detail. The CI field may comprise four bits. A slow associated control channel (SACCH) field contains sixteen bits of control information. A payload data field may contain 160 bits of payload data, which can be in the form of adaptive-differential pulse code modulated (ADPCM) data. The payload data field is described below in more detail. A CRC field is provided for error detection and verification. The CRC field may also include sixteen bits. A guard bits field, which may also include sixteen bits, is provided to ensure that bits from consecutive slots do not overlap.

The payload data field of protocol 90 can contain several different types of logical channels. In one embodiment, these logical channel types can be an adaptive-differential pulse code modulated (ADPCM) traffic channel (TCH), a VOX channel (VOX), a fast associated control channel (FACCH), and two types of user specified packet channels (USPCH1 and USPCH2). Each type of logical channel can be defined by a specific bit pattern in the channel identifier field. Further, the payload data field of protocol 90 may carry any of three types of data: speech data, user packet data, and control data. Speech data is carried by the traffic channel (TCH) or VOX channel type of a payload field. Speech data is "real-time" data. As such, if a frame is missed or an error is detected within the TCH field, then the current payload data field is discarded and error mitigation is invoked, in which case, speech data from the previous frame is repeated. Control data and user packet data are carried in the FACCH, USPCH1, or USPCH2 logical channel types of a payload field. User packet data and control data are "non real-time" data, and as such, if these types of data are missed or corrupted, then an automatic retransmission request (ARQ) may be implemented to invoke the retransmission of the data.

In order to provide high quality sound for voice communication in a TDMA system, it is important to maximize the recovery of real-time speech data carried in a transmitted signal. Speech data is present in the TCH and VOX logical channels of the payload field in a TDMA burst. The TCH logical channel carries voiced ADPCM speech, so that if this channel is undetected, the perceived quality of speech at a transceiver will decline. Thus, it is desirable to recover the TCH channel if a frame is missed or corrupted. In contrast, a VOX logical channel contains no voiced speech, but only background noise. Accordingly, the perceived quality of speech at the transceiver is not adversely affected if this logical channel type is undetected. With the present invention, crucial speech data contained in a payload of a TDMA signal slot can be recovered even when a marker sequence for the slot is undetected.

Micro-Sequencer

FIG. 5 shows additional details of micro-sequencer 48 used in a preferred embodiment. As previously described, micro-sequencer 48 builds the slots for transmission/reception and the synchronization of the slot bits with the base station timing.

As shown in FIG. 5, micro-sequencer 48 includes a time base control 92 which outputs clock signals synchronized with the bit rate of a base station (e.g., base cell 14 in FIG. 1). Time-base control 92 receives the system clock signal output by active/paging module 72 (FIG. 3) and a signal from UW correlators, described below. The synchronization of time base control 92 output may be performed in a conventional manner, for example, by synchronizing its output with the received preamble bits transmitted by the base station.

Time-base control 92 maintains an internal clock which can be used to recover voice data in a payload even when a marked sequence is not detected. In one embodiment, the internal clock may have a frequency of 384 kbits/s. The time-base of the internal clock can be periodically synchronized with a base station so that transceiver 30 remains well-aligned with the base station for receiving signals therefrom. Accordingly, when the marker sequence of a TDMA signal slot is not detected, this internal clock can be referenced to support the recovery of payload data.

A micro-sequencer engine 94 and at least one finite state machine (FSM) 96 are coupled to time base control 92 and receive the clock signals output therefrom. Micro-sequencer engine 94 generally controls micro-sequencer 48. For example, micro-sequencer engine 94 provides enabling commands to FSMs 96.

FSMs 96 perform the function of building the protocols. Each of FSMs 96 can be implemented as a hardware state machine which provides a sequence of control codes synchronized with the bit rate clock output by time base control 92. Each FSM 96 comprises at least one logic circuit which may be formed of AND gates and OR gates interconnected so that the proper sequence of codes is generated. Typically, one or more signals generated by an FSM 96 is coupled back to an input node(s) of the same or a different FSM 96 to create the sequence of control codes.

Control codes in the re-timed output of micro-sequencer 48 enable and disable various devices and operations in the proper sequence and at the proper times to build a slot in the appropriate protocol, such as protocol 90 shown in FIG. 4. For example, the fixed codes in the ramp, start symbol, preamble, and unique word fields may be inserted into a slot at the proper times by enabling fixed parallel-to-serial storage devices containing those fixed codes. These storage devices can be located in sequencer RAM 50 in FIG. 3. To identify the desired mode of operation in order to signal to FSMs 96 which series of control codes should be output from micro-sequencer 48, micro-sequencer engine 94 is provided with a dynamic control architecture.

An address generation unit (AGU) 98 couples micro-sequencer engine 94 to sequencer RAM 50. Sequencer RAM 50 may contain a series of high-level commands or microcode instructions for providing instructions to micro-sequencer engine 94, which in turn provides instructions to the FSMs 96. Upon powering up of the TDMA transceiver, micro-sequencer 48 is reset by microcontroller 32 (FIG. 3), thereby allowing time for microcontroller 32 to load any suitable microcode in sequencer RAM 50. AGU 98 generates one or more data RAM addresses which may be enabled so that audio data for the voice field may be inserted into a slot.

A process event array 100 receives the control codes output by FSMs 96. Process event array 100 acts as a combiner and re-times the output of micro-sequencer 48. Process event array 100 outputs signals to a number of other components including slot control 52, scramble/descramble engine 54, encryption/de-encryption engine 56, CRC engine 58, and RF control pins 84 (FIG. 3).

CRC Engine

Figure 6:
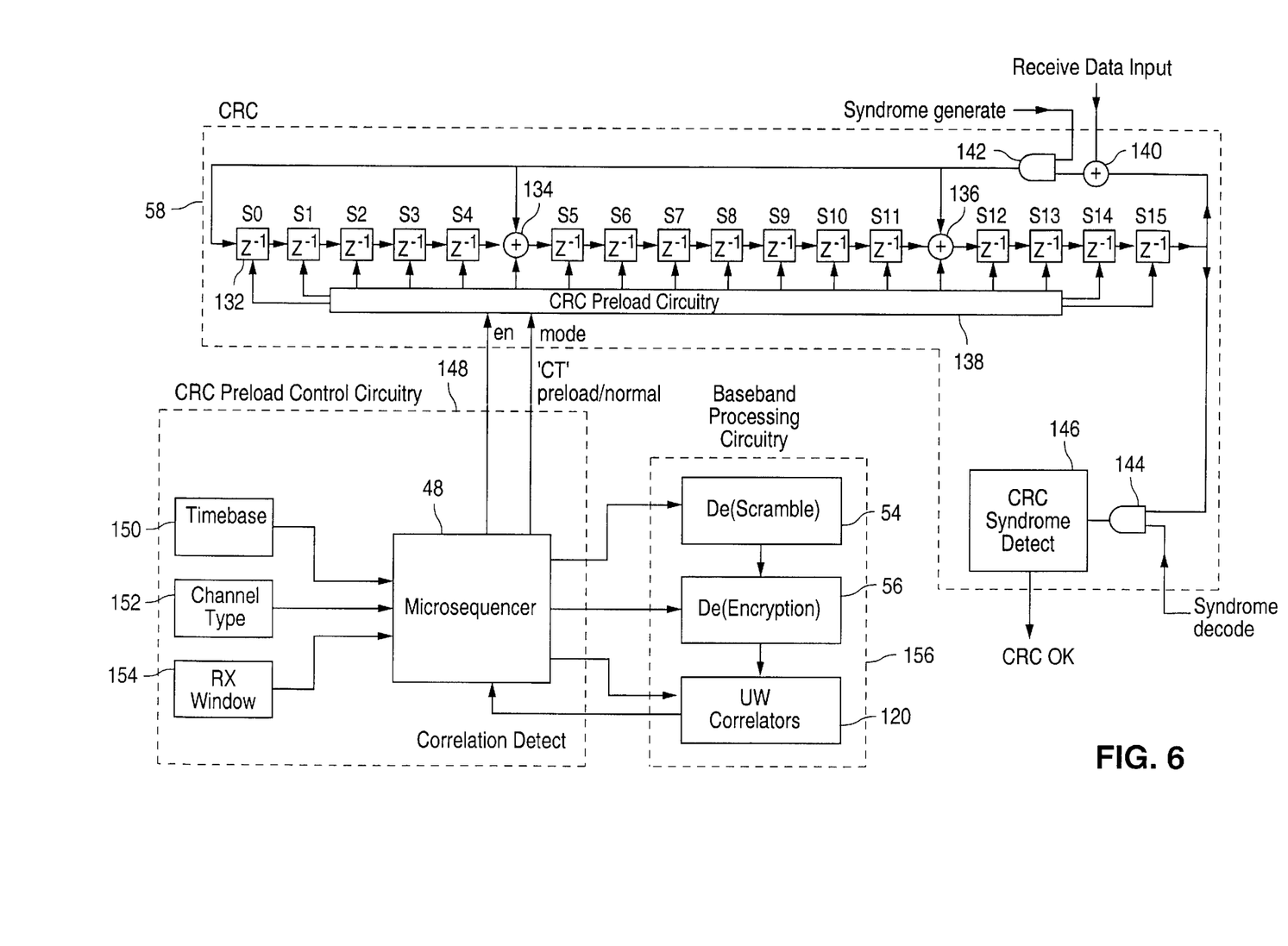
FIG. 6 shows additional details of a CRC engine used in a preferred embodiment.

FIG. 6 provides additional details for CRC engine 58 shown in FIG. 3. CRC engine 58 generally functions to encode/decode sequences of bits for transmission/reception. Furthermore, as described herein, when a marker sequence is not detected for a received bursted signal, CRC engine 58 can load a predetermined bit pattern into the CI field of the signal to indicate that the payload contains voice data.

CRC engine 58 includes a series of delay elements 132 which, as shown, as labeled S0–S15. For clarity, only one of delay elements 132 is given a reference numeral. Each delay element 132 can store a bit of information. Delay elements 132 implement a linear feedback shift register (LFSR). Adders 134 and 136 interrupt the series of delay elements 132.

CRC preload circuitry 138 is coupled to each of delay elements 132. CRC preload circuitry 138 generally can load specific bit values into delay elements 132. In particular, CRC preload circuitry 138 may load a predetermined sequence or pattern of bit values into delay elements S0–S15. When a marker sequence for a received burst is undetected, such a predetermined bit pattern may be loaded into the channel identifier (CI) field of the burst in order to allow data from the payload field to be recovered. CRC preload circuitry 138 comprises separate input leads for an enable signal and a mode signal. The enable signal enables the operation of CRC engine 58. The mode signal dictates whether CRC engine 58 functions as an encoder/decoder or as a preloader for the predetermined bit pattern.

An adder 140 receives input data, which can be in the form of a bitstream, for CRC engine 58. A syndrome generate circuit 142 is coupled to adder 140 and receives a bitstream therefrom. Syndrome generate circuit 142 is responsive to a syndrome generate control signal which allows CRC engine 58 to operate as an encoder. A syndrome decode circuit 144 receives a syndrome decode control signal which allows CRC engine 50 to operate as a decoder.

A CRC syndrome detect module 146, coupled to the output lead of syndrome decode circuit 144, examines the CRC field of a received burst in order to validate payload data.

CRC preload control circuitry 148 is coupled to CRC engine 58. CRC preload circuitry 148 enables CRC engine 58 and can direct CRC preload circuitry 138 to preload the predetermined bit pattern into delay elements 132. CRC preload circuitry 148 generates the enable and mode control signals. As shown, CRC preload circuitry 148 comprises microsequencer 48, a timebase module 150, a channel type module 152, and a receive (RX) window module 154.

Baseband processing circuitry 156 is coupled to CRC preload circuitry 148. Baseband processing circuitry 156 generally functions to perform baseband processing of signals. Baseband processing circuitry 156 includes scramble/descramble engine 54, encryption/de-encryption engine 56, and UW correlators module 120 (FIG. 7).

Modem

FIG. 7 provides additional details for modem 74 shown in FIG. 3. Modem 74, as described above, generally functions to modulate and demodulate various signals to and from TDMA transceiver 30. Accordingly, modem 74 includes a modulator 101 and a demodulator 102.

Modulator 101, as depicted, includes a read only memory (ROM) 103 which supports an information (I) channel for non-voice communication and a voice traffic (Q) channel for voice communication. An adder 104, coupled to I/Q ROM 102, combines the information and voice channels in a signal which is output to digital analog converter (DAC) 76 for transmission out of transceiver 30 (FIG. 3).

Demodulator 102 includes a first multiplier 106 and a second multiplier 108, which are coupled to LPF 82. These multipliers 106 and 108 combine the signal from LPF module 82 with cosine (cos) and sine (sin) waveform signals, respectively. An arc-tan ROM 110 is coupled to multipliers 106 and 108 to receive the signals output therefrom. Arc-tan ROM 110 implements an "arc-tan" transfer function, as understood by those in the art. A multiplier 112 is coupled to arc-tan ROM 110 for receiving the signal output by arc-tan ROM 110. An automatic frequency control (AFC) 114, also coupled to multiplier 112, functions to control the frequency of internal time base maintained by time base control 92 (FIG. 5).

A clock recovery module 116 supports the recovery of a clock signal out of a data stream of a received signal. This can be accomplished by searching for and identifying the preamble/clock recovery (PR) field in a data stream. Clock recovery module 116 outputs a recovered clock signal for synchronization of TDMA transceiver 30. A data recovery module 118, coupled to multiplier 112 and clock recovery module 116, receives the data stream and the recovered clock signal. Data recovery module 118 uses the recovered clock signal to sample the data stream in order to recover data. Data recovery module 118 generates a signal which is input into BMC 44. Both data recovery and clock recovery techniques and circuit implementations therefor are well-known to those in the art.

A unique word (UW) correlators module 120 is coupled to data recovery module 118. UW correlators module 120, in conjunction with scramble/descramble engine 54 and encryption/de-encryption engine 56 (FIG. 3), supports baseband processing. UW correlators module 120 receives the recovered data from data recovery module 118. UW correlators module 120 looks for a specific dotting pattern in the recovered data, such dotting pattern marking the beginning of the actual payload. If the dotting pattern is found, UW correlators module 120 sends a signal to micro-sequencer 48 to align the time-base control 92 (FIG. 5) contained therein. This allows TDMA transceiver 30 to establish slot alignment for the received signal.

Further, UW correlators module 120 supports a number of different "link-levels." Each link-level defines a respective window which provides a certain margin of error for the detection of a marker sequence or unique word in a received TDMA signal. In one embodiment, for example, seven link-levels may be provided.

Control Signals for an Undetected Marker Sequence

Figure 8:
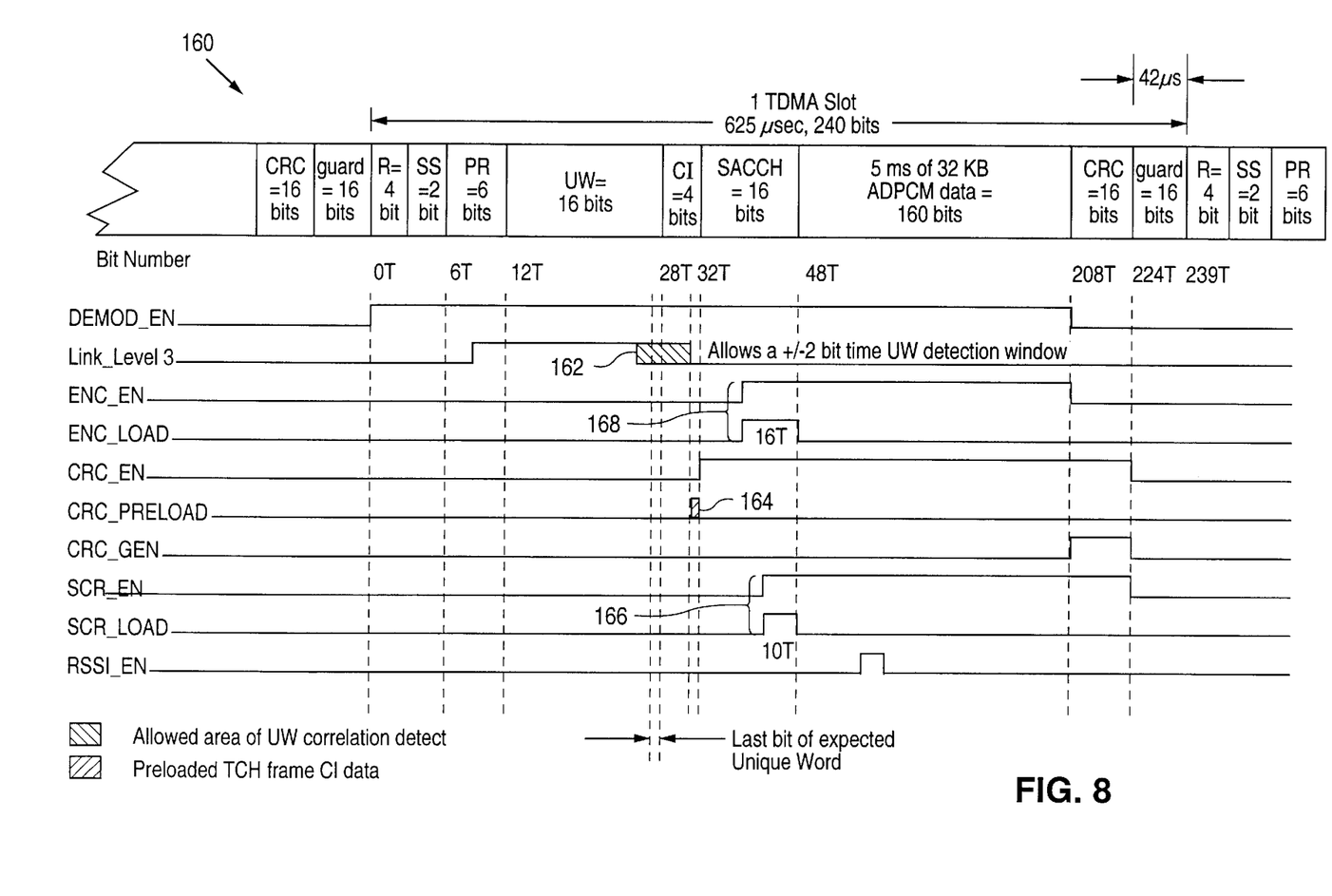
FIG. 8 is a diagram illustrating exemplary control signals for a communications channel with an undetected marker sequence, in accordance with an embodiment of the present invention.

FIG. 8 is a diagram 160 illustrating exemplary control signals for a communications channel with an undetected marker sequence, in accordance with an embodiment of the present invention. These control signals may be received, generated within, and/or transmitted out of TDMA transceiver 30 during its operation.

As described herein, the window for allowably receiving a unique word can be set to vary +/– a number of bit times from the time at which the last bit of the unique word is expected. A more detailed description of a dynamic window for detecting the unique word (e.g., marker sequence), or more generally, a synchronization code, is provided in U.S. Pat. Nos. 5,598,419 and 5,668,813, both assigned to the present Assignee and incorporated herein by reference. The unique word can be a predetermined, 16-bit sequence.

As depicted in FIG. 8, TDMA transceiver 30 is operating at a link-level which provides a window with a 2-bit margin for the detection of the last bit of the expected unique word (i.e., marker sequence) position in a slot. This window is highlighted by shaded area 162. Any 16-bit series which coincidentally matches the unique word but having a last bit which does not occur within the window does not trigger a false synchronization.

The channel identifier (CI) field is four bits long. Preferably, the largest window for receiving the unique word is set to expire before the end of the CI field. In accordance with the present invention, it is possible to recover the payload data that follows the CI field when the unique word is not detected by TDMA transceiver 30.

More specifically, if the unique word is not completely detected within four bits of the expected bit time (i.e., by the end of the CI field), then it is outside the allowable window for reception. In such case, the CRC engine 58 is pre-loaded with the channel identifier code representing a TCH logical channel. That is, the CI field can be preloaded with a predetermined pattern (e.g., "00011") for a TCH logical channel. Such a predetermined pattern is highlighted by shaded area 164 in FIG. 8. Scramble/descramble engine 54 and encryption/de-encryption engine 56 are initialized, as indicated by rising edges 166 and 168, respectively, and processing of the received data is begun. Starting after the CI field, the TCH payload data in the data field will be recovered. This payload data can be ADPCM data.

As an error detection mechanism, the CRC field is checked at the end of the payload field. If the CRC is correct (i.e., the bit pattern contained therein is the pattern for a TCH channel), then TDMA transceiver 30 has successfully recovered the TCH payload data even though the unique word or marker sequence was not detected in the TDMA burst.

Control Signals for a Detected Marker Sequence

Figure 9:
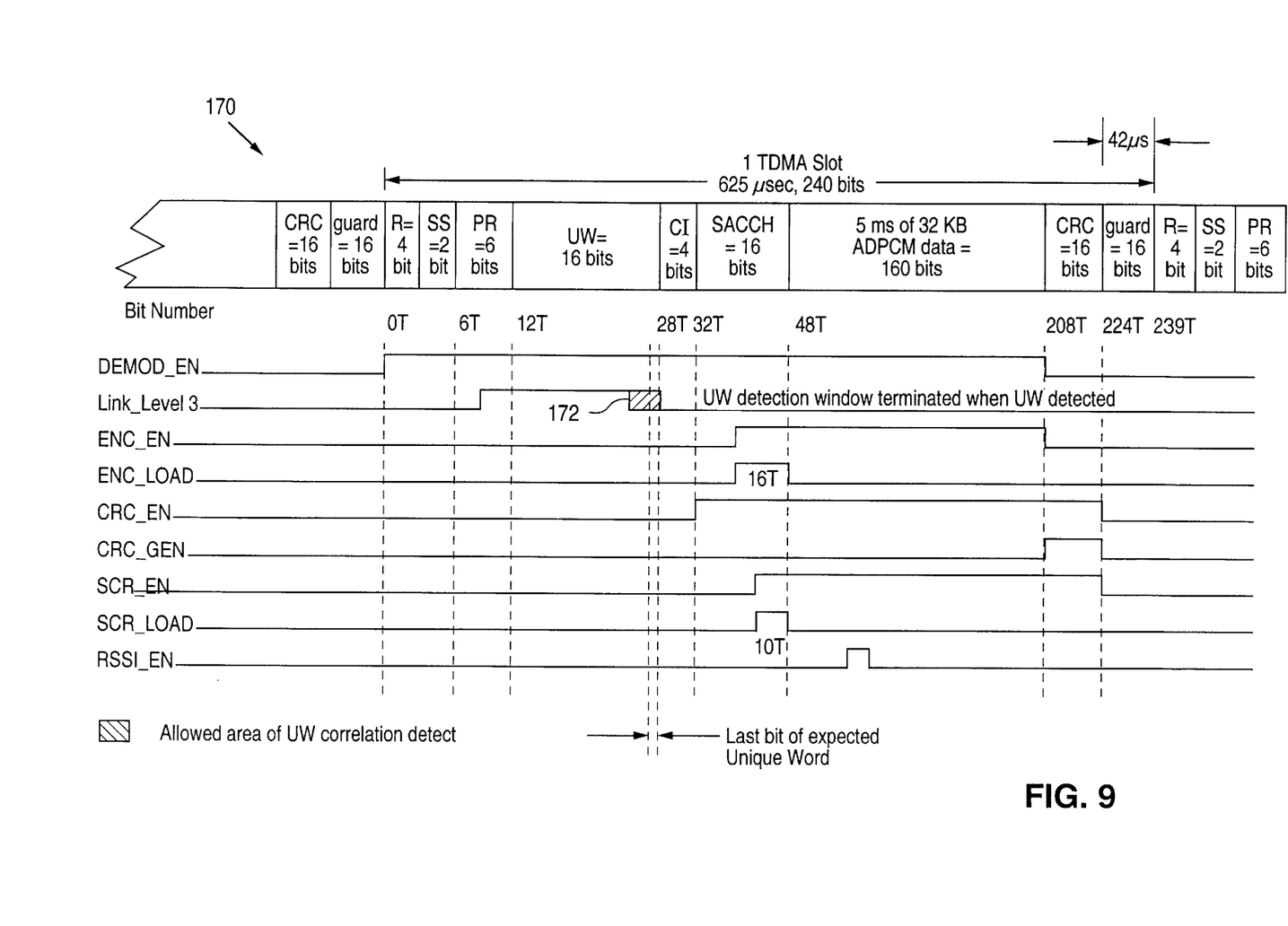
FIG. 9 is another diagram illustrating exemplary control signals for a communications channel with an undetected marker sequence, in accordance with an embodiment of the present invention.

FIG. 9 is a diagram 170 illustrating exemplary control signals for a communications channel with an undetected marker sequence, in accordance with an embodiment of the present invention. These control signals may be received, generated within, and/or transmitted out of TDMA transceiver 30 during its operation.

Similar to FIG. 8, FIG. 9 depicts a window for allowably receiving a unique word. This window is highlighted by shaded area 172. If the unique word is completely detected during the allowable time, which is meant to be the case in FIG. 9, then the window terminates.

Operation

Figure 10:
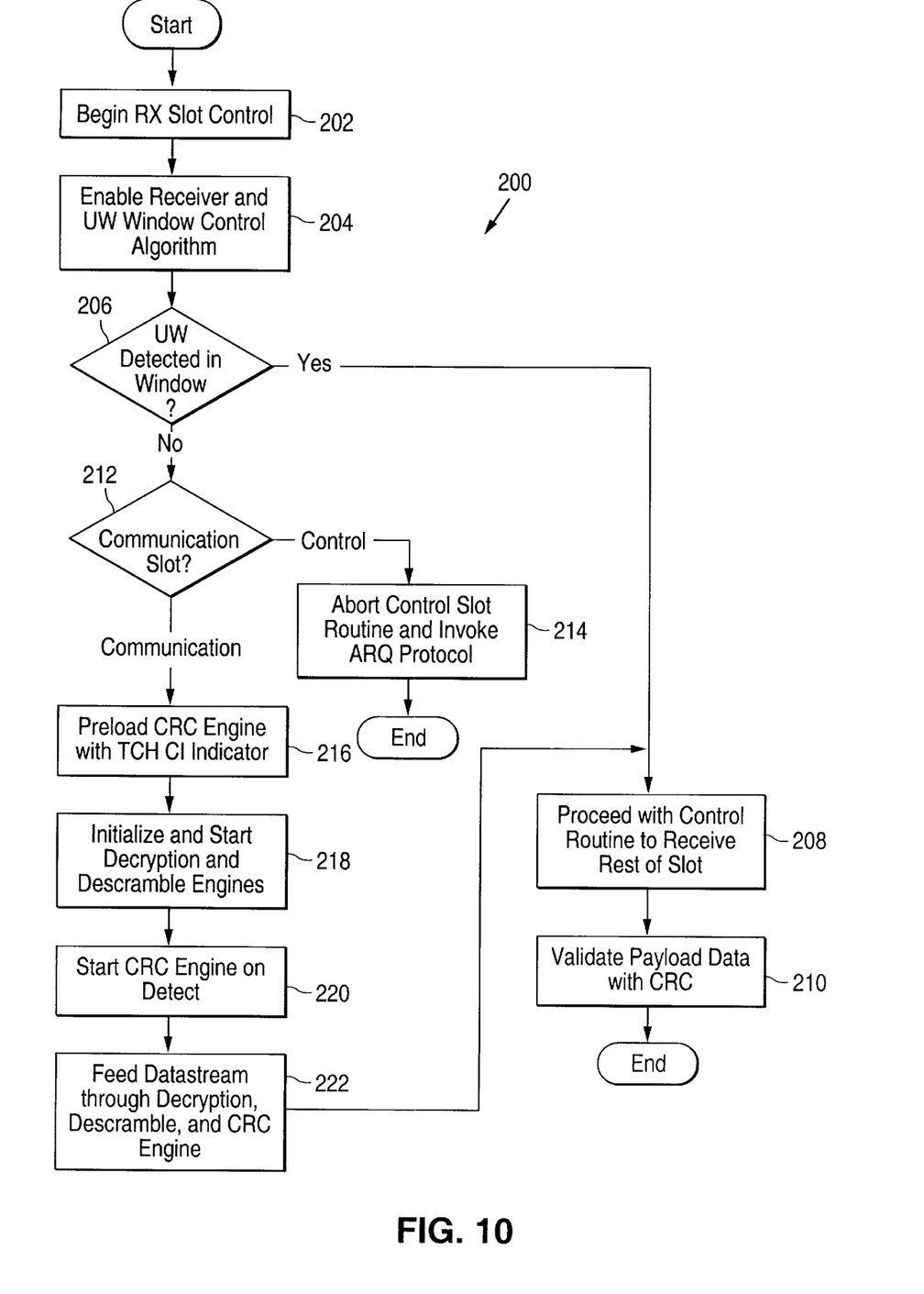
FIG. 10 is a flow diagram of a method for dynamically recovering a TDMA signal when a marker sequence is undetected, in accordance with a preferred embodiment of the present invention.

FIG. 10 is a flow diagram of a method 200 for dynamically recovering a TDMA signal when a marker sequence is undetected, in accordance with the preferred embodiment of the present invention. Method 200 may be performed by various elements of transceiver 30 (FIG. 3) on a receive data in (RDI) signal.

Method 200 begins at step 202 where micro-sequencer 48 of BMC 44 begins a receive (RX) slot control routine. This routine operates upon the RDI signal which transceiver 30 receives at IF select 78. The slot control routine may operate on a bursted signal on a slot-by-slot basis, and manages the reception and processing of the bursted signal in order to recover data, such as speech data, user packet data, or control data. This data may be contained within the payload data field of a suitable slot protocol, such as protocol 90 (FIG. 4).

At step 204, micro-sequencer 48 enables the receiver components of transceiver 30 and the unique word (UW) window control algorithm. This UW window control algorithm can be stored and performed, at least in part, by UW correlators module 120 in modem 74. According to the UW window control algorithm, a window for detecting the last bit of a unique word is initially set to an infinite length. The UW window control algorithm operates upon and looks primarily at the first portion of a slot, which is where a unique word is expected to be found.

At step 206, micro-sequencer 48 determines whether the unique word for a burst was detected within the window specified in the UW window control algorithm. If the unique word is detected within such window, method 200 moves to step 208 where transceiver 30 proceeds with the slot control routine to receive and process the rest of the slot. This remaining portion of a slot contains the payload data (e.g., speech data, user packet data, or control data) for communicating voice or control information.

In one embodiment, processing of the slot is accomplished as follows. UW correlators module 120 may send a signal to time base control 92 in micro-sequencer 48 to synchronize the time base. UW correlators module 120 also interrupts micro-sequencer 48 so that the micro-sequencer can initiate or direct the scramble/descramble, encryption/de-encryption, and CRC engines 54–58. UW correlators module 120, scramble/descramble engine 54 and encryption/de-encryption engine 56 perform baseband processing on the received signal.

At step 210, micro-sequencer 48 validates the payload data using the high-order polynomial contained in the CRC (for detection and verification) field. This step ensures that data within the payload is indeed voice data. In particular, if the bit pattern of the CRC field is not a specified bit pattern which indicates that the payload data contains voice data, then the payload data is disregarded. Otherwise, the payload data is used, thereby improving sound quality. Afterwards, method 200 ends.

Returning again to step 206, if micro-sequencer 48 does not detect the unique word within the defined window, then at step 212 micro-sequencer 48 determines whether the current slot is a communication slot for carrying speech data or a control slot. Generally, TDMA transceiver 30 will know in advance whether a particular slot is for voice or non-voice information based upon the mode of operation for TDMA transceiver 30. If transceiver 30 is operating in a control mode, a slot will be a non-voice communication slot which may carry control or other non-voice data in its payload field. If transceiver 30 is operating in an active mode, however, it is very likely that the slot is a voice communication slot carrying voice data in its payload field.

Thus, if it is determined at step 212 that the current slot is a control slot, then the slot carries "non-real time" data (e.g., user packet and/or control data) which can be retransmitted. Accordingly, at step 214, micro-sequencer 48 aborts the control slot routine (which would otherwise continue to process the slot) and evokes an automatic retransmission request (ARQ) protocol. The ARQ protocol automatically requests the retransmission of the data. Afterwards method 200 ends.

Otherwise, if it is determined at step 212 that the current slot is a voice communication slot, the slot carries voice data in its payload field. Thus, at step 216 transceiver 30 preloads the CRC engine 58 with an appropriate channel identifier (CI) to indicate that the slot is a traffic channel (TCH) for voice communication. In one embodiment, such CI indicator can be the binary number "0001." At step 218, transceiver 30 initializes and starts the scramble/descramble engine 54 and encryption/de-encryption engine 56 in BMC 44 (FIG. 3). At step 220, CRC engine 58 is started on a detect routine.

At step 222, the datastream for the slot is fed through scramble/descramble engine 54, encryption/de-encryption engine 56, and CRC engine 58. These engines operate upon a payload field containing a TCH logical channel to recover the speech data carried therein. Method 200 then moves to step 208 where, as described above, transceiver 30 proceeds with the slot control routine, and then to step 210 where micro-sequencer 48 validates the payload data using the CRC. Method 200 then ends.

This disclosure primarily focuses on those non-conventional features of a TDMA transceiver. Those circuits typically used in TDMA transceivers which have not been described in detail may generally be conventional circuits using conventional algorithms. The embodiments described herein may be implemented in any TDMA system, although the examples here are generally directed to the Personal Handy Phone System (PHS).

While particular embodiments of the present invention have been shown and described, it will be obvious to those skilled in the art that changes and modifications may be made without departing from this invention in its broader aspects and, therefore, the appending claims are to encompass within their scope all such changes and modifications as fall within the true spirit and scope of this invention.

What is claimed is:

1. A system comprising:
   a modem operable to receive a burst of a time division multiple access (TDMA) signal; and
   a burst mode controller connected to the modem, the burst mode controller operable to detect a unique word in the burst, the burst mode controller further operable to load a predetermined bit pattern into a channel identifier field of the burst if the unique word is not detected, the predetermined bit pattern indicating that a payload field of the burst contains voice data.

2. The system of claim 1 wherein the burst mode controller comprises a micro-sequencer for detecting the unique word in the burst.

3. The system of claim 1 wherein the burst mode controller comprises a CRC engine for loading the predetermined bit pattern into the channel identifier field of the burst.

4. The system of claim 3 wherein the CRC engine comprises:
   a linear feedback shift register; and
   CRC preload circuitry operable to load the predetermined bit pattern into the linear feedback shift register.

5. The system of claim 1 wherein the burst mode controller is further operable to perform baseband processing of the TDMA signal.

6. The system of claim 5 wherein the burst mode controller comprises a scramble/descramble engine and an encryption/decryption engine for performing baseband processing of the TDMA signal.

7. The system of claim 1 wherein the modem comprises a unique word correlators modules operable to support a dynamic window within which the unique word is allowably detected.

8. The system of claim 1 wherein the burst mode controller is operable to validate a data payload using a CRC field of the burst.

9. The system of claim 1 wherein the burst mode controller is operable to determine whether the burst is a communication slot or a control slot.

10. A method comprising:
    receiving a burst of a time division multiple access (TDMA) signal;
    attempting to detect a unique word in the burst;
    loading a predetermined bit pattern into a channel identifier field of the burst if the unique word is not detected, the predetermined bit pattern indicating that a payload field of the burst contains voice data.

11. The method of claim 10 further comprising performing baseband processing on the TDMA signal.

12. The method of claim 10 further comprising validating a data payload using a CRC field of the burst.

13. The method of claim 10 further comprising determining whether the burst is a communication slot or a control slot.

14. The method of claim 13 further comprising invoking an automatic retransmission request (ARQ) protocol if the burst is a control slot.

15. The method of claim 10 wherein attempting comprises determining whether the unique word is detected during a predefined window.

16. A system comprising:
    a modem operable to receive a burst of a time division multiple access (TDMA) signal;
    a micro-sequencer connected to the modem, the micro-sequencer operable to detect a unique word in the burst; and
    a CRC engine connected to the micro-sequencer, the CRC engine operable to load a predetermined bit pattern into a channel identifier field of the burst if the unique word is not detected, the predetermined bit pattern indicating that a payload field of the burst contains voice data.

17. The system of claim 16 further comprising a scramble/descramble engine and an encryption/decryption engine operable to perform baseband processing of the TDMA signal.

18. The system of claim 16 wherein the CRC engine comprises:
    a linear feedback shift register; and
    CRC preload circuitry operable to load the predetermined bit pattern into the linear feedback shift register.

19. The system of claim 16 wherein the modem comprises a unique word correlators modules operable to support a dynamic window within which the unique word is allowably detected.

20. The system of claim 16 wherein the micro-sequencer is operable to validate a data payload using a CRC field of the burst.

21. The system of claim 16 wherein the micro-sequencer is operable to determine whether the burst is a communication slot or a control slot.

* * * * *